US009356943B1

(12) United States Patent
Lopilato et al.

(10) Patent No.: US 9,356,943 B1
(45) Date of Patent: May 31, 2016

(54) SYSTEMS AND METHODS FOR PERFORMING SECURITY ANALYSES ON NETWORK TRAFFIC IN CLOUD-BASED ENVIRONMENTS

(71) Applicant: Symantec Corporation, Mountain View, CA (US)

(72) Inventors: Joseph Lopilato, Townsend, MA (US); Shuzhou Liu, Toronto (CA)

(73) Assignee: Symantec Corporation, Mountain View, CA (US)

( * ) Notice: Subject to any disclaimer, the term of this patent is extended or adjusted under 35 U.S.C. 154(b) by 58 days.

(21) Appl. No.: 14/453,617

(22) Filed: Aug. 7, 2014

(51) Int. Cl.
*H04L 9/00* (2006.01)
*H04L 29/06* (2006.01)
*G06F 21/50* (2013.01)

(52) U.S. Cl.
CPC ........ *H04L 63/1408* (2013.01); *H04L 63/1416* (2013.01); *H04L 63/1441* (2013.01); *H04L 63/1466* (2013.01)

(58) Field of Classification Search
CPC ............ H04L 63/1408; H04L 63/1416; H04L 63/1441; H04L 63/1466
See application file for complete search history.

(56) References Cited

U.S. PATENT DOCUMENTS

| | | | | | |
|---|---|---|---|---|---|
| 2005/0235164 | A1* | 10/2005 | Gassoway | ........... | H04L 63/1416 713/193 |
| 2008/0082662 | A1* | 4/2008 | Dandliker | ............... | H04L 63/10 709/225 |
| 2009/0013399 | A1* | 1/2009 | Cottrell | ............... | H04L 63/0421 726/12 |
| 2009/0249484 | A1* | 10/2009 | Howard | ................ | G06F 21/567 726/24 |
| 2011/0078309 | A1* | 3/2011 | Bloch | ................. | H04L 12/2602 709/224 |
| 2012/0117649 | A1* | 5/2012 | Holloway | ............. | H04L 67/146 726/24 |

OTHER PUBLICATIONS

"Hypertext Transfer Protocol", http://en.wikipedia.org/wiki/Hypertext_Transfer_Protocol, as accessed Jun. 19, 2014, Wikipedia, (Oct. 8, 2005).
Elson, J. "Internet Content Adaptation Protocol (ICAP)", https://tools.ietf.org/html/rfc3507, as accessed Jun. 19, 2014, Request for Comments 3507, The Internet Society, (Apr. 2003).

* cited by examiner

*Primary Examiner* — Theodore C Parsons
(74) *Attorney, Agent, or Firm* — ALG Intellectual Property, LLC

(57) ABSTRACT

The disclosed computer-implemented method for performing security analyzes on network traffic in cloud-based environments may include (1) collecting network traffic exchanged between a source device and a destination device for a security analysis by (A) receiving, from the destination device, a response to a request sent by the source device, (B) identifying, in a header of the response, information that facilitates access to at least a portion of the request, and (C) obtaining, based at least in part on the information identified in the header of the response, the portion of the request sent by the source device, and then (2) performing the security analysis on the network traffic by analyzing the portion of the request sent by the source device and at least a portion of the response. Various other methods, systems, and computer-readable media are also disclosed.

17 Claims, 10 Drawing Sheets

```
                          Response
                            812
--------------------------------------------------------------------------------
************************************************

STATUS LINE:    HTTP/1.1 200 OK
        HEADER:         Date: Fri, 01 Aug 2014 04:15:12 GMT
                        Server: Apache/1.5.82 (Win32)
                        Last-Modified: Mon, 28 Jul 2014
                        ETag: "0-23-4024c3a5"
                        Accept-Ranges: bytes
                        Connection: close
                        Content-Type: text/html
                        x-symext: GET /doc/test.html HTTP/1.1
                        x-symext: Host: www.suspiciouswebsite.com BODY:           <h1>Zeus is a Trojan horse that attacks Windows machines</h1>

SYSTEMS AND METHODS FOR PERFORMING SECURITY ANALYSES ON NETWORK TRAFFIC IN CLOUD-BASED ENVIRONMENTS

BACKGROUND

Network security systems often monitor computer networks for potentially malicious activity. For example, an Intrusion Prevention System (IPS) may perform a security analysis on a HyperText Transfer Protocol (HTTP) exchange between a client and a server. In this example, the IPS may obtain an HTTP request from the client and the corresponding HTTP response from the server and then analyze the HTTP request/response pair to determine whether this HTTP exchange represents a potential security risk.

Unfortunately, the process of identifying HTTP request/response pairs for the IPS's security analysis may be fairly difficult in certain cloud-based environments. For example, a distributed cloud-based environment may include multiple Internet Content Adaption Protocol (ICAP) servers that handle network traffic exchanged between various clients and web servers. In this example, the ICAP server that handles an HTTP request from a client may not be the same ICAP server that handles the corresponding HTTP response from a web server. As a result, these ICAP servers may have difficulty matching the HTTP request with the corresponding HTTP response.

As another example, a multi-tenant cloud-based environment may include an ICAP server that multiplexes network traffic exchanged between various clients and web servers over a single network connection. In other words, the ICAP server may receive HTTP requests from multiple clients and HTTP responses from multiple web servers via the same network connection. As a result, this ICAP server may have difficulty matching the HTTP requests with the corresponding HTTP responses.

Unfortunately, without the entire HTTP request/response pair, the IPS's security analysis may have diminished effectiveness. The instant disclosure, therefore, identifies and addresses a need for improved systems and methods for performing security analyses on network traffic in cloud-based environments.

SUMMARY

As will be described in greater detail below, the instant disclosure describes various systems and methods for performing security analyses on network traffic in cloud-based environments by enabling servers to identify request/response pairs travelling through such cloud-based environments.

In one example, a computer-implemented method for performing security analyses on network traffic in cloud-based environments may include (1) collecting network traffic (such as HTTP traffic) exchanged between a source device and a destination device for a security analysis by (A) receiving, from the destination device, a response (such as an HTTP response) to a request (such as an HTTP request) sent by the source device, (B) identifying, in a header of the response, information that facilitates access to at least a portion of the request (such as a body, a header, and/or a command line), and (C) obtaining, based at least in part on the information identified in the header of the response, the portion of the request sent by the source device, and then (2) performing the security analysis (such as an IPS analysis) on the network traffic by analyzing the portion of the request sent by the source device and at least a portion of the response (such as a body, a header, and/or a status line). In this example, the information that facilitates access to the portion of the request may include the portion of the request itself and/or a Uniform Resource Locator (URL) that references a file that includes the portion of the request.

In one example, the method may also include receiving, at a server that handles at least a portion of the network traffic, the request sent by the source device. In this example, the method may further include identifying the portion of the request and then creating, in the request, a custom header that includes the information that facilitates access to the portion of the request. Additionally or alternatively, the method may include forwarding the request with the custom header to the destination device.

In one example, the method may also include creating a file that includes the portion of the request. In this example, the method may further include inserting a link to the file into the custom header in the request. Moreover, the method may include storing the file at the server that received the request sent by the source device. Additionally or alternatively, the method may include storing the file at a storage device accessible to the server that received the request sent by the source device.

In one example, the method may also include receiving the response at another server that did not receive the request sent by the source device. In this example, the method may further include identifying, in the header of the response received at the other server, the link to the file that includes the portion of the request. Additionally or alternatively, the method may include retrieving, based at least in part on the link identified in the header of the response, the portion of the request included in the file stored at the server.

In one example, the method may also include receiving the response at the same server that received the request sent by the source device. In this example, the method may further include identifying, in the header of the response received at the server, the link to the file that includes the portion of the request. Additionally or alternatively, the method may include retrieving, based at least in part on the link identified in the header of the response, the portion of the request included in the file stored at the server. This server may multiplex, over a single network connection, network traffic exchanged between a plurality of source devices and a plurality of destination devices.

In one example, the method may also include determining that a size of the portion of the request is below a certain threshold. In this example, the method may further include inserting the portion of the request into the custom header in the request in response to this determination.

In one example, the method may also include providing the portion of the request and the portion of the response to a security scanner (such as an IPS scanner). In this example, the method may further include directing the security scanner to perform the security analysis on the network traffic by analyzing the portion of the request and the portion of the response.

As another example, a system for implementing the above-described method may include (1) a collection module, stored in memory, that collects network traffic exchanged between a source device and a destination device for a security analysis by (A) receiving, from the destination device, a response to a request sent by the source device, (B) identifying, in a header of the response, information that facilitates access to at least a portion of the request sent by the source device, and (C) obtaining, based at least in part on the information identified in the header of the response, the portion of the request sent by the source device, (2) a security module, stored in memory, that performs the security analysis on the network traffic by analyzing the portion of the request sent by the source device and at least a portion of the response received from the destination device, and (3) at least one processor that executes the collection module and the security module.

As a further example, the above-described method may be encoded as computer-readable instructions on a non-transitory computer-readable medium. For example, a computer-readable medium may include one or more computer-executable instructions that, when executed by at least one processor of a computing device, may cause the computing device to (1) collect network traffic exchanged between a source device and a destination device for a security analysis by (A) receiving, from the destination device, a response to a request sent by the source device, (B) identifying, in a header of the response, information that facilitates access to at least a portion of the request sent by the source device, and (C) obtaining, based at least in part on the information identified in the header of the response, the portion of the request sent by the source device, and then (2) performing the security analysis on the network traffic by analyzing the portion of the request sent by the source device and at least a portion of the response received from the destination device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 8 is an illustration of another exemplary response to a request sent by a source device.

Figure 1:
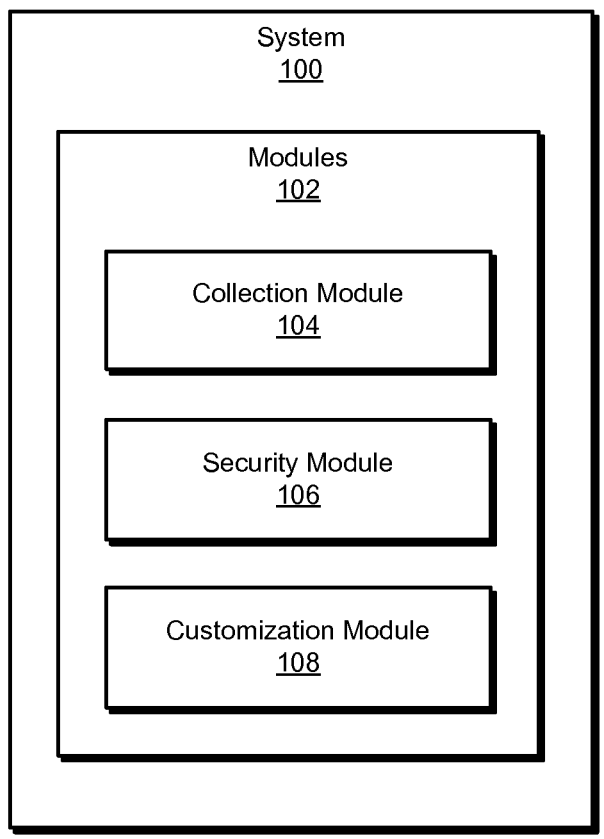
FIG. 1 is a block diagram of an exemplary system for performing security analyses on network traffic in cloud-based environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for performing security analyses on network traffic in cloud-based environments. As will be explained in greater detail below, by creating a custom header in a request detected in a cloud-based environment, the various systems and methods described herein may insert information in the custom header that facilitates access to at least a portion of the request. By inserting such information in the custom header, the various systems and methods described herein may enable a destination server to detect the information in the custom header and then generate a response whose header includes the information.

Upon detecting the response travelling through the cloud-based environment, these systems and methods may use the information included in the header of the response to identify and/or access the portion of the request. By identifying and/or accessing the portion of the request in this way, these systems and methods may be able to match the request with the corresponding response, thereby identifying the entire request/response pair. With the entire request/response pair, the various systems and methods described herein may increase the effectiveness of a security analysis performed on the exchange involving the request/response pair.

Figure 2:
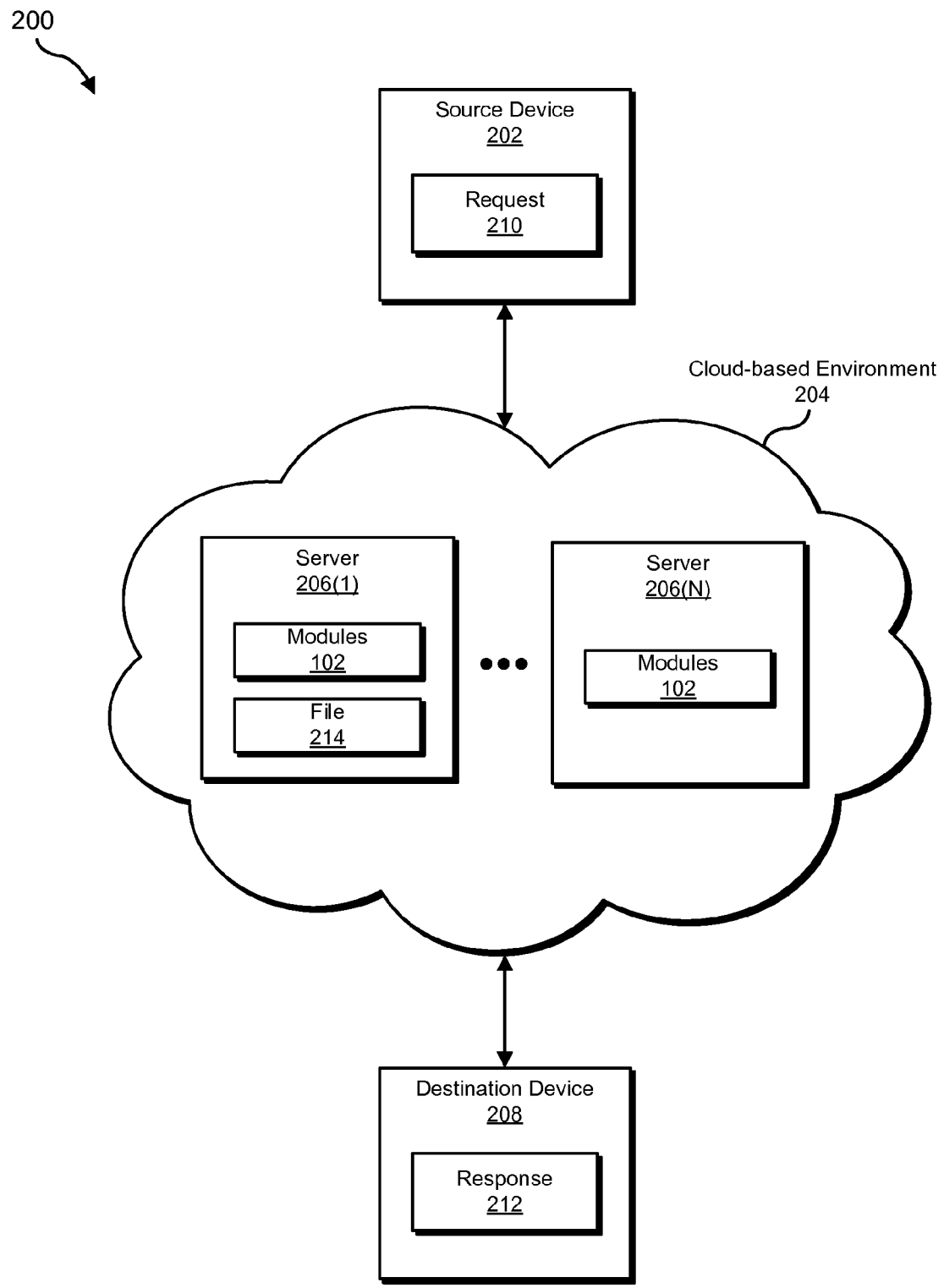
FIG. 2 is a block diagram of an additional exemplary system for performing security analyses on network traffic in cloud-based environments.

The following will provide, with reference to FIGS. 1-2, detailed descriptions of exemplary systems for performing security analyses on network traffic in cloud-based environments. Detailed descriptions of corresponding computer-implemented methods will be provided in connection with FIG. 3. Detailed descriptions of an exemplary file that includes at least a portion of a request sent by a source device will be provided in connection with FIG. 4. Detailed descriptions of exemplary requests sent by a source device will be provided in connection with FIGS. 5 and 7. Detailed descriptions of exemplary responses to requests sent by a source device will be provided in connection with FIGS. 6 and 8. In addition, detailed descriptions of an exemplary computing system and network architecture capable of implementing one or more of the embodiments described herein will be provided in connection with FIGS. 9 and 10, respectively.

FIG. 1 is a block diagram of an exemplary system 100 for performing security analyses on network traffic in cloud-based environments. As illustrated in this figure, exemplary system 100 may include one or more modules 102 for performing one or more tasks. For example, and as will be explained in greater detail below, exemplary system 100 may include a collection module 104 that collects network traffic exchanged between a source device and a destination device for a security analysis by (1) receiving, from the destination device, a response to a request sent by the source device, (2) identifying, in a header of the response, information that facilitates access to at least a portion of the request sent by the source device, and then (3) obtaining, based at least in part on the information identified in the header of the response, the portion of the request sent by the source device.

In addition, and as will be described in greater detail below, exemplary system 100 may include a security module 106 that performs the security analysis on the network traffic by analyzing the portion of the request sent by the source device and at least a portion of the response received from the destination device. Exemplary system 100 may also include a customization module 108 that customizes at least a portion of the request sent by the source device to facilitate accessing this portion of the request at a later point in time. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a cloud-based environment 204 with one or more servers 206(1)-(N). Additionally or alternatively, system 200 may include a source device 202 in communication with a destination device 208 via cloud-based environment 204.

In one example, source device 202 may generate and/or send request 210 to destination device 208 via cloud-based environment 204. The term "request," as used herein, generally refers to any type or form of request and/or command issued in connection with a resource and/or destination device. In one example, request 210 may include a body, a header, and/or a command line. Examples of request 210 include, without limitation, HTTP request, HTTP Secure (HTTPS) requests, ICAP requests, Extensible Markup Language (XML) requests, combinations of one or more of the same, variations of one or more of the same, or any other suitable request.

In one example, destination device 208 may generate and/or send a response 212 to source device 202 via cloud-based environment 204. The term "response," as used herein, generally refers to any type or form of response and/or reply triggered by a request from a source device. In one example, response 212 may include a body, a header, and/or a status line. Examples of response 212 include, without limitation, HTTP responses, HTTPS responses, ICAP responses, XML responses, combinations of one or more of the same, variations of one or more of the same, or any other suitable response.

As shown in FIG. 2, one or more of servers 206(1)-(N) may be programmed with one or more of modules 102. Additionally or alternatively, one or more of servers 206(1)-(N) may include a file 214 that contains and/or represents at least a portion of request 210 sent by source device 202. In this example, the portion of request 210 may include a body, a header, and/or a command line of request 210.

In one embodiment, one or more of modules 102 in FIG. 1 may, when executed by at least one processor of one or more of servers 206(1)-(N), enable one or more of servers 206(1)-(N) to perform security analyses on network traffic in cloud-based environments. For example, and as will be described in greater detail below, one or more of modules 102 may cause server 206(N) to (1) collect network traffic exchanged between source device 202 and destination device 208 for a security analysis by (A) receiving response 212 from destination device 208, (B) identifying, in a header of response 212, information that facilitates access to at least a portion of request 210 sent by source device 202, and (C) obtaining, based at least in part on the information identified in the header of response 212, the portion of request 210 sent by source device 202 and then (2) performing the security analysis on the network traffic by analyzing the portion of request 210 sent by source device 202 and at least a portion of response 212 received from destination device 208.

Source device 202 and destination device 208 generally represent any type or form of computing device capable of reading computer-executable instructions. Examples of source device 202 and destination device 208 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 910 in FIG. 9, or any other suitable computing system.

Servers 206(1)-(N) generally represent any type or form of computing device capable of collecting, receiving, intercepting, and/or forwarding network traffic within a cloud-based environment. Examples of servers 206(1)-(N) include, without limitation, application servers, web servers, cloud-based servers, network devices, storage servers, and/or database servers configured to run certain software applications and/or provide various web, cloud, network, storage, and/or database services. In one example, servers 206(1)-(N) may include and/or represent ICAP servers that handle network traffic travelling through cloud-based environment 204.

Cloud-based environment 204 generally represents any medium and/or architecture capable of facilitating cloud-based services, communications, and/or data transfer. Examples of cloud-based environment 204 include, without limitation, an intranet, a Wide Area Network (WAN), a Local Area Network (LAN), a Personal Area Network (PAN), the Internet, a Power Line Communications (PLC) network, a cellular network (e.g., a Global System for Mobile Communications (GSM) network), exemplary network architecture 1000 in FIG. 10, combinations of one or more of the same, variations of one or more of the same, or any other suitable cloud-based environment. Cloud-based environment 204 may facilitate communication or data transfer using wireless or wired connections. In one embodiment, cloud-based environment 204 may facilitate communication between source device 202 and destination device 206.

Figure 3:
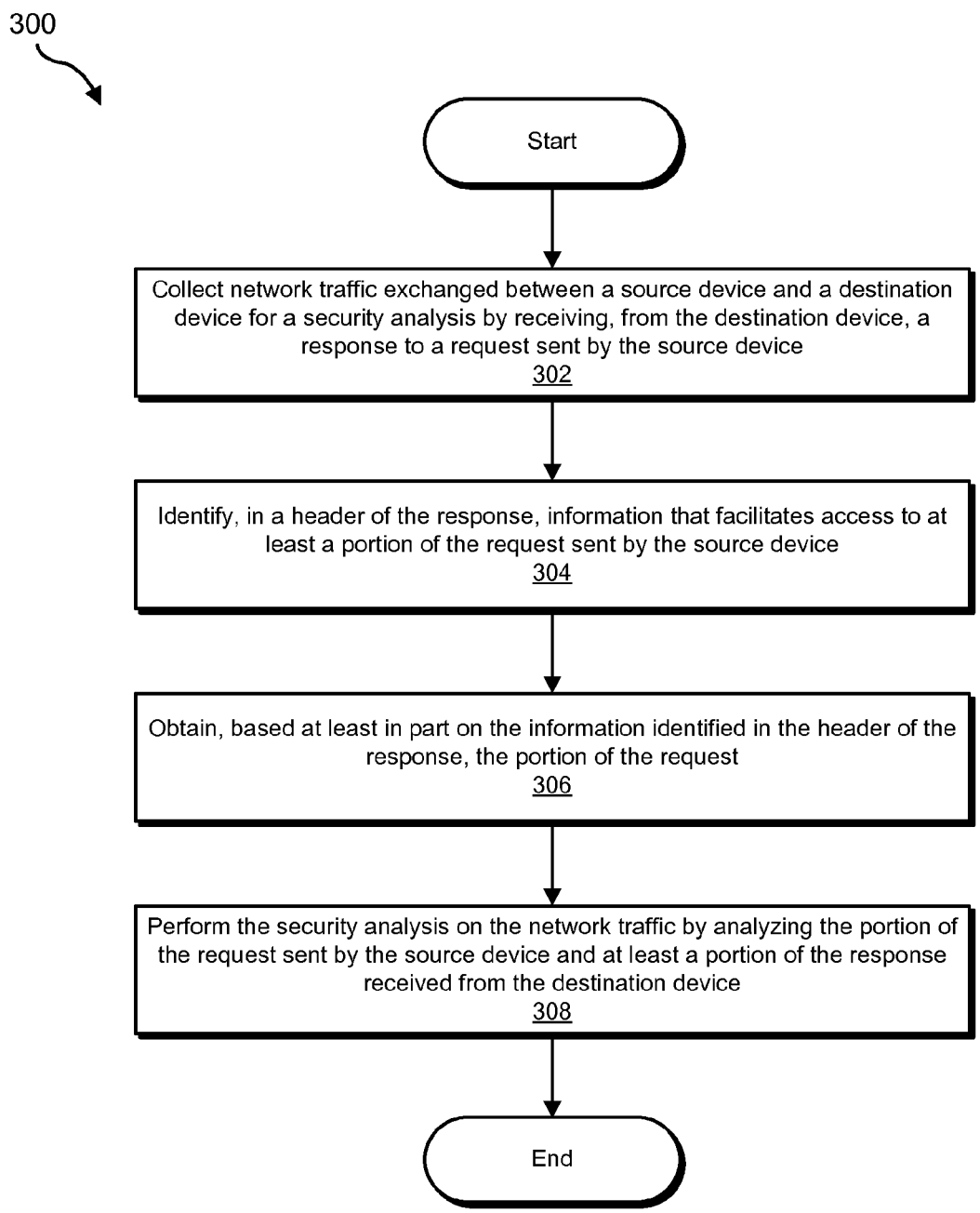
FIG. 3 is a flow diagram of an exemplary method for performing security analyses on network traffic in cloud-based environments.

FIG. 3 is a flow diagram of an exemplary computer-implemented method 300 for performing security analyses on network traffic in cloud-based environments. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 910 in FIG. 9, and/or portions of exemplary network architecture 1000 in FIG. 10.

As illustrated in FIG. 3, at step 302 one or more of the systems described herein may collect network traffic exchanged between a source device and a destination device for a security analysis by receiving, from the destination device, a response to a request sent by the source device. For example, at step 302 collection module 104 may, as part of one or more of servers 206(1)-(N) in FIG. 2, collect network traffic exchanged between source device 202 and destination device 208 for a security analysis. During this collection of network traffic, collection module 104 may receive response 212 from destination device 208 in reply to request 210 sent by source device 202.

In one embodiment, the collected network traffic may include and/or represent HTTP traffic exchanged between source device 202 and destination device 208. Similarly, request 210 may include and/or represent an HTTP request sent by source device 202 to destination device 208. Additionally or alternatively, response 212 may include and/or represent an HTTP response sent from destination device 208 to source device 202.

The term "security analysis," as used herein, generally refers to any type or form of analysis and/or examination of network traffic with respect to security and/or potentially malicious activity. Examples of this security analysis include, without limitation, IPS analyses, network behavior analyses, firewall analyses, antivirus analyses, Unified Threat Management (UTM) analyses, combinations of one or more of the same, variations of one or more of the same, or any other suitable security analysis.

The systems described herein may perform step 302 in a variety of ways and/or contexts. In one example, collection module 104 may collect network traffic exchanged between source device 202 and destination device 208 while handling such network traffic within cloud-based environment 204. For example, source device 202 may send request 210 to destination device 208 via cloud-based environment 204. While traveling from source device 202 to destination device 208 via cloud-based environment 204, request 210 may arrive at server 206(1). As request 210 arrives at server 206(1), collection module 104 may detect and/or receive request 210.

In one example, customer HTTP traffic may be routed through a squid proxy residing in a datacenter. In this example, the customer HTTP traffic may include request 210. The squid proxy may use the ICAP protocol to send the HTTP traffic to server 206(1). As this HTTP traffic arrives at server 206(1), collection module 104 may detect and/or receive request 210 in the HTTP traffic.

Upon detection and/or receipt of request 210 at server 206(1), one or more of the systems herein may customize at least a portion of request 210 to facilitate accessing this portion of request 210 at a later point in time. For example, customization module 108 may, as part of server 206(1) in FIG. 2, identify a body, a header, and/or a command line of request 210. In this example, customization module 108 may create file 214 in FIG. 4 that includes the body, header, and/or command line of request 210. By creating file 214 in FIG. 4 in this way, customization module 108 may be able to maintain and/or preserve the body, header, and/or command line of request 210 for the security analysis.

Figure 4:
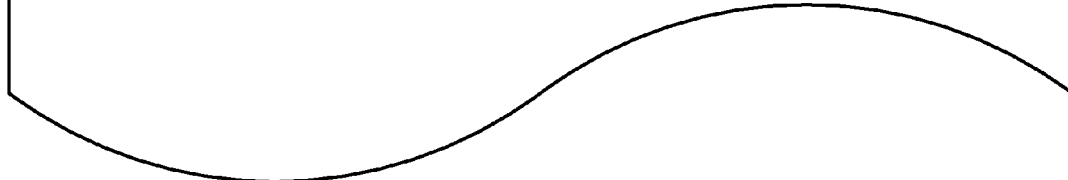
FIG. 4 is an illustration of an exemplary file that includes at least a portion of a request sent by a source device.

As shown in FIG. 4, file 214 may identify a command line of request 210 (in this example, "POST/suspicious/upload.asmx HTTP/1.1"), a header of request 210 (in this example, "Host: www.suspiciouswebsite.com," "Content-Type: application/x-www-form-urlencoded; charset=utf-8," and "Content-Length: 178"), and a body of request 210 (in this example, "Action=CreateJob," "&JobId=Example123," "&SignatureMethod=HmacSHA256," "MignatureVersion=2," "&Version=2014-06-03," "&Signature=hd4cwPDdYvGIDMBQ1Lx83DV4NzsdC6XIXU," and "&Timestamp=2014-08-01T10%3A43%3A62Z").

In one example, customization module 108 may store file 214 at the server that received request 210 sent by source device 202. For example, customization module 108 may store file 214 at server 206(1). Additionally or alternatively, customization module 108 may store file 214 at a storage device (not illustrated in FIG. 2) that is accessible to server 206(1).

In one example, customization module 108 may create a custom header in request 210. In this example, the custom header may include information that facilitates access to the portion of request 210. This information may include the portion of request 210 itself and/or a link (such as a URL) to file 214 that includes the portion of request 210. Upon creating this custom header in request 210, customization module 108 may forward request 210 to destination device 208.

Figure 5:
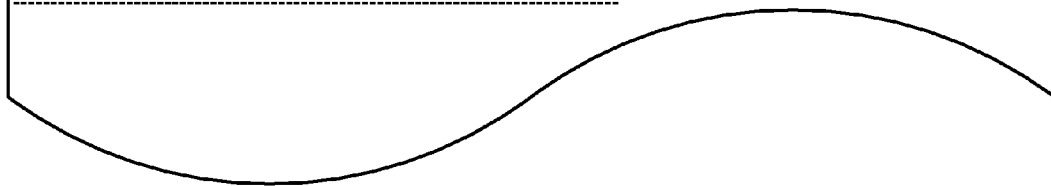
FIG. 5 is an illustration of an exemplary request that includes a custom header.

As a specific example, customization module 108 may create the custom header in request 210 in FIG. 5 by adding URL "x-symext: file://Server 206(1)/C:/Requests/File 214" to the header of request 210. In this example, the "x-symext: file://Server 206(1)/C:/Requests/File 214" URL may reference the storage location of file 214 on server 206(1). The "x-symext" feature may indicate that this URL represents a custom header.

As shown in FIG. 5, request 210 may include a command line (in this example, "POST/suspicious/upload.asmx HTTP/1.1"), a pre-existing header (in this example, "Host: www.suspiciouswebsite.com," "Content-Type: application/x-www-form-urlencoded; charset=utf-8," "Content-Length: 178"), a custom header (in this example, "x-symext: file://Server 206(1)/C:/Requests/File 214"), and a body (in this example, "Action=CreateJob," "&JobId=Example123," "&SignatureMethod=HmacSHA256," "&SignatureVersion=2," "&Version=2014-06-03," "&Signature=hd4cwPDdYvGIDMBQ1Lx83DV4NzsdC6XIXU," and "&Timestamp=2014-08-01T10%3A43%3A62Z"). In one example, the custom header may be encrypted. Additionally or alternatively, the custom header may be obfuscated.

In one example, request 210 may trigger the generation and/or transmission of response 212. For example, destination device 208 may generate response 212 upon receiving request 210. In this example, destination device 208 may be configured to identify the custom header in request 210 and then insert and/or embed at least a portion of this custom header into the header of response 212. Accordingly, destination device 208 may insert and/or embed the information that facilitates access to at least a portion of request 210 into the header of response 212.

Figure 6:
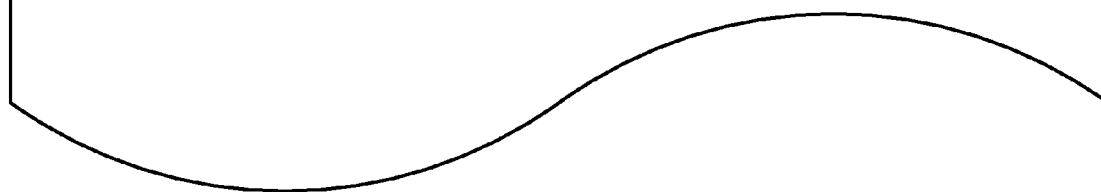
FIG. 6 is an illustration of an exemplary response to a request sent by a source device.

As shown in FIG. 6, response 212 may include a status line (in this example, "HTTP/1.1 200 OK"), a header (in this example, "Content-Type: text/xml; charset=utf-8," "Content-Length: 96," and "x-symext: file://Server 206(1)/C:/Requests/File 214"), and a body (in this example, "<?xml version='1.0' encoding='utf-8'?>" and "<string xmlns='http://suspiciouswebsite.com/'>string</string>").

Upon generating response 212, destination device 208 may send response 212 to source device 202 via cloud-based environment 204 in reply to request 210. For example, destination device 208 may send response 212 to server 206(N) on the way to source device 202 via cloud-based environment 204. As response 212 arrives at server 206(N), collection module 104 may detect and/or receive response 212.

In another example, source device 202 may send a request 710 to destination device 208 via cloud-based environment 204. While traveling from source device 202 to destination device 208 via cloud-based environment 204, request 710 may arrive at server 206(N). As request 710 arrives at server 206(N), collection module 104 may detect and/or receive request 710.

Upon detection and/or receipt of request 710 at server 206(N), one or more of the systems herein may customize at least a portion of request 710 to facilitate accessing this portion of request 210 at a later point in time. For example, customization module 108 may, as part of server 206(N) in FIG. 2, identify at least a portion of request 710. In this example, collection module 104 may identify a body, a header, and/or a command line of request 710.

Additionally or alternatively, customization module 108 may determine that a size of the portion of request 710 is below a certain threshold. For example, customization module 108 may determine that the total size of the body, header, and command line of request 710 is below 100 bytes. In response to this determination, customization module 108 may create a custom header in request 710 by inserting and/or embedding the body and/or command line into the header. Additionally or alternatively, customization module 108 may create a custom header in request 710 by duplicating and/or modifying the header (by, e.g., adding the "x-symext:" feature to indicate that the duplicate represents a custom header). Upon creating this custom header in request 710, customization module 108 may forward request 710 to destination device 208.

Figure 7:
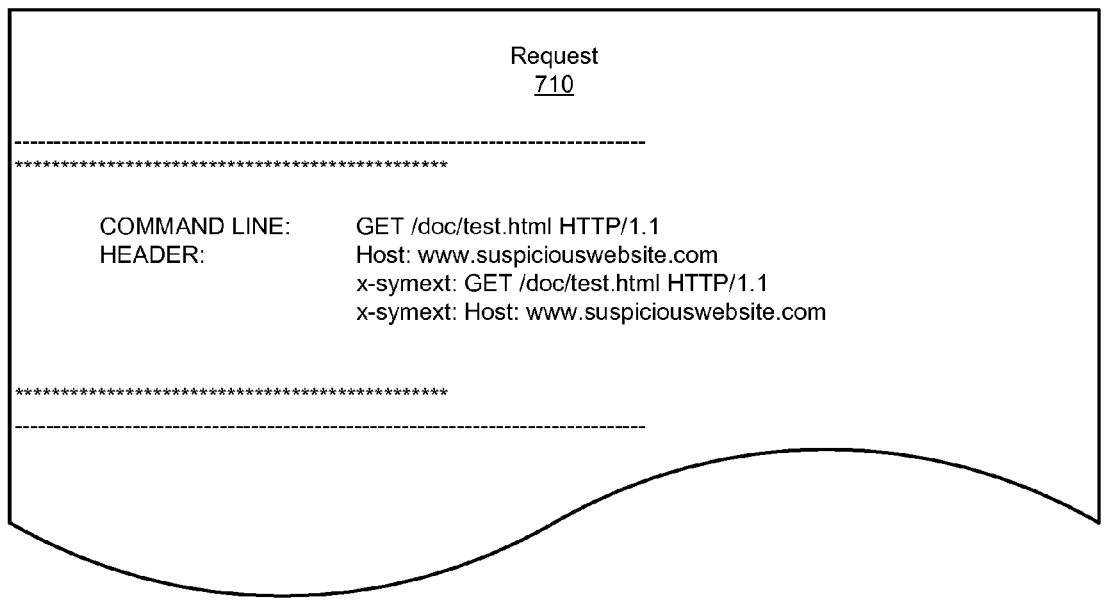
FIG. 7 is an illustration of an exemplary request sent by a source device.

As a specific example, customization module 108 may create the custom header in request 710 in FIG. 7 by adding segments "x-symext: GET/doc/test.html HTTP/1.1" and "x-symext: Host: www.suspiciouswebsite.com" to the header of request 710. In this example, the "x-symext: GET /doc/test.html HTTP/1.1" and "x-symext: Host: www.suspiciouswebsite.com" segments may have a total size of less than 100 bytes. In this example, the "x-symext:" feature may indicate that these segments represent a custom header.

As shown in FIG. 7, request 710 may include a command line (in this example, "GET /doc/test.html HTTP/1.1"), a pre-existing header (in this example, "Host: www.suspiciouswebsite.com"), and a custom header (in this example, "x-symext: GET /doc/test.html HTTP/1.1" and "x-symext: Host: www.suspiciouswebsite.com").

In one example, request 710 may trigger the generation and/or transmission of response 812. For example, destination device 208 may generate response 812 upon receiving request 710. In this example, destination device 208 may be configured to identify the custom header in request 710 and then insert and/or embed at least a portion of this custom header into the header of response 812. Accordingly, destination device 208 may insert and/or embed information that facilitates access to at least a portion of request 710 into the header of response 812.

As shown in FIG. 8, response 812 may include a status line (in this example, "HTTP/1.1 200 OK"), a header (in this example, "Date: Fri, 1 Aug. 2014 04:15:12 GMT," "Server: Apache/1.5.82 (Win32)," "Last-Modified: Mon, 28 Jul. 2014," "ETag: "0-23-4024c3a5," "Accept-Ranges: bytes," "Connection: close," "Content-Type: text/html," "x-symext: GET /doc/test.html HTTP/1.1," and "x-symext: Host: www.suspiciouswebsite.com"), and a body (in this example, "<h1>Zeus is a Trojan horse that attacks Windows machines</h1>").

Upon generating response 812, destination device 208 may send response 812 to source device 202 via cloud-based environment 204 in reply to request 710. In one example, destination device 208 may send response 812 to the same server that received request 710 from source device 202. For example, destination device 208 may send response 812 to server 206(N) on the way to source device 202 via cloud-based environment 204. In this example, server 206(N) may multiplex network traffic exchanged between various source devices and destination devices over a single network connection. As response 812 arrives at server 206(N), collection module 104 may detect and/or receive response 812.

Returning to FIG. 3, at step 304 one or more of the systems described herein may identify, in a header of the response, information that facilitates access to at least a portion of the request sent by the source device. For example, at step 304 collection module 104 may, as part of server 206(N) in FIG. 2, identify information in the header of response 212. In this example, the information may facilitate access to at least a portion of request 210 sent by source device 202. By identifying the information in this way, collection module 104 may be able to match response 212 from destination device 208 with corresponding request 210 from source device 202, thereby identifying the entire request/response pair for the security analysis.

The systems described herein may perform step 304 in a variety of ways and/or contexts. In one example, collection module 104 may identify the information that facilitates access to the portion of request 210 by searching response 212. For example, collection module 104 may search response 212 for the header. Upon finding the header in response 212 during this search, collection module 104 may identify the information that facilitates access to the portion of request 210 in the header.

As a specific example, collection module 104 may identify the "x-symext: file://Server 206(1)/C:/Requests/File 214" URL in the header of response 212. In this example, the "x-symext: file://Server 206(1)/C:/Requests/File 214" URL may reference the storage location of file 214 on server 206(1). Collection module 104 may recognize the "x-symext: file://Server 206(1)/C:/Requests/File 214" URL as being a link that facilitates access to file 214 based at least in part on the "x-symext:" feature.

In another example, collection module 104 may identify information that facilitates access to at least a portion of request 710 by searching response 812. For example, collection module 104 may search response 812 for the header. Upon finding the header in response 812 during this search, collection module 104 may identify the information that facilitates access to the portion of request 710 in the header.

As a specific example, collection module 104 may identify the "x-symext: GET /doc/test.html HTTP/1.1" and "x-symext: Host: www.suspiciouswebsite.com" segments in the header of response 812. In this example, the "x-symext: GET /doc/test.html HTTP/1.1" and "x-symext: Host: www.suspiciouswebsite.com" segments may represent the portion of request 710 itself. Collection module 104 may recognize these segments as being the portion of request 710 based at least in part on the "x-symext:" feature.

Returning to FIG. 3, at step 306 one or more of the systems described herein may obtain, based at least in part on the information identified in the header of the response, the portion of the request sent by the source device. For example, at step 306 collection module 104 may, as part of server 206(N) in FIG. 2, obtain the portion of request 210 based at least in part on the information identified in the header of response 212. In this example, the information identified in the header of response 212 may facilitate access to at least a portion of request 210 sent by source device 202. By obtaining the portion of request 210 in this way, collection module 104 may be able to provide the entire request/response pair for the security analysis.

The systems described herein may perform step 306 in a variety of ways and/or contexts. In one example, collection module 104 may obtain the portion of the request stored at server 206(1) based at least in part on the URL included in the information. For example, collection module 104 may retrieve the portion of request 210 stored at server 206(1) based at least in part on the "x-symext: file://Server 206(1)/

C:/Requests/File 214" URL included in the information. In this example, collection module 104 may ask server 206(1) to send file 214 located at "C:/Requests/File 214" to server 206(N) via cloud-based environment 204. As file 214 arrives at server 206(N), collection module 104 may detect and/or receive file 214.

Additionally or alternatively, collection module 104 may obtain the portion of the request itself in the header of the response. For example, collection module 104 may retrieve the "x-symext: GET/doc/test.html HTTP/1.1" and "x-symext: Host: www.suspiciouswebsite.com" segments from the header of response 812. As described above, the "x-symext: GET /doc/test.html HTTP/1.1" and "x-symext: Host: www.suspiciouswebsite.com" segments may represent the portion of request 710 itself.

In another example, security module 106 may obtain the portion of the request stored at server 206(1) based at least in part on the URL included in the information. For example, security module 106 may retrieve the portion of request 210 stored at server 206(1) based at least in part on the "x-symext: file://Server 206(1)/C:/Requests/File 214" URL included in the information. In this example, security module 106 may ask server 206(1) to send file 214 located at "C:/Requests/File 214" to server 206(N) via cloud-based environment 204. As file 214 arrives at server 206(N), security module 106 may detect and/or receive file 214.

Returning to FIG. 3, at step 308 one or more of the systems described herein may perform the security analysis on the network traffic by analyzing the portion of the request sent by the source device and at least a portion of the response received from the destination device. For example, at step 308 security module 106 may, as part of server 206(N) in FIG. 2, perform the security analysis on the network traffic by analyzing the portion of request 210 and at least a portion of response 212 (such the body, header, and/or status line). By performing the security analysis in this way, security module 106 may be able to increase the effectiveness of the security analysis since the security analysis involves the entire request/response pair (as opposed to just the request or just the response).

The systems described herein may perform step 308 in a variety of ways and/or contexts. In one example, security module 106 may perform the security analysis on the entire request/response pair at server 206(N). For example, security module 106 may perform an IPS analysis on the portion of request 210 and the portion of response 212. In this example, the IPS analysis may involve analyzing the body, header, and/or command line of request 210 as well as the body, header, and/or status line of response 212.

Additionally or alternatively, security module 106 may perform the security analysis by delegating at least a portion of the security analysis to a separate security scanner. For example, security module 106 may provide the portion of request 710 and/or the portion of response 812 to an IPS scanner. In this example, security module 106 may direct the IPS scanner to perform an IPS analysis on the request/response pair by analyzing the portion of request 710 and the portion of response 812.

As explained above in connection with method 300 in FIG. 3, one or more of the systems described herein may perform IPS analyses on request/response pairs travelling through cloud-based environments. For example, an ICAP server included in a cloud-based environment may receive an HTTP request from a client. In this example, the ICAP server may create a file that includes at least a portion of the HTTP request and then store the file. Upon storing this file, the ICAP server may insert a URL to the file into the header of the HTTP request. The ICAP server may then forward the HTTP request to the corresponding web server.

Upon receiving the HTTP request, the web server may generate an HTTP response to the HTTP request. The header of this HTTP response may include the URL to the file stored on the ICAP server. The web server may then send the HTTP response to the client via the cloud-based environment.

While travelling through the cloud-based environment, the HTTP response may arrive at another ICAP server. This other ICAP server may search the header of the HTTP response for any information that identifies and/or facilitates access to the HTTP response. During this search of the header, the other ICAP server may identify the URL to the file stored on the ICAP server. The other ICAP server may then use the URL to obtain the portion of the HTTP request from the file. Upon obtaining the portion of the HTTP request, the other ICAP server may perform an IPS analysis on the HTTP request/response pair.

Additionally or alternatively, the other ICAP server may send at least a portion of the HTTP response to an IPS scanner that analyzes HTTP request/response pairs. The other ICAP may also direct the ICAP server to send the portion of the HTTP request to the IPS scanner. Upon receiving the request/response pair, the IPS scanner may perform an IPS analysis on the request/response pair by analyzing the portion of the HTTP request and the portion of the HTTP response.

Figure 9:
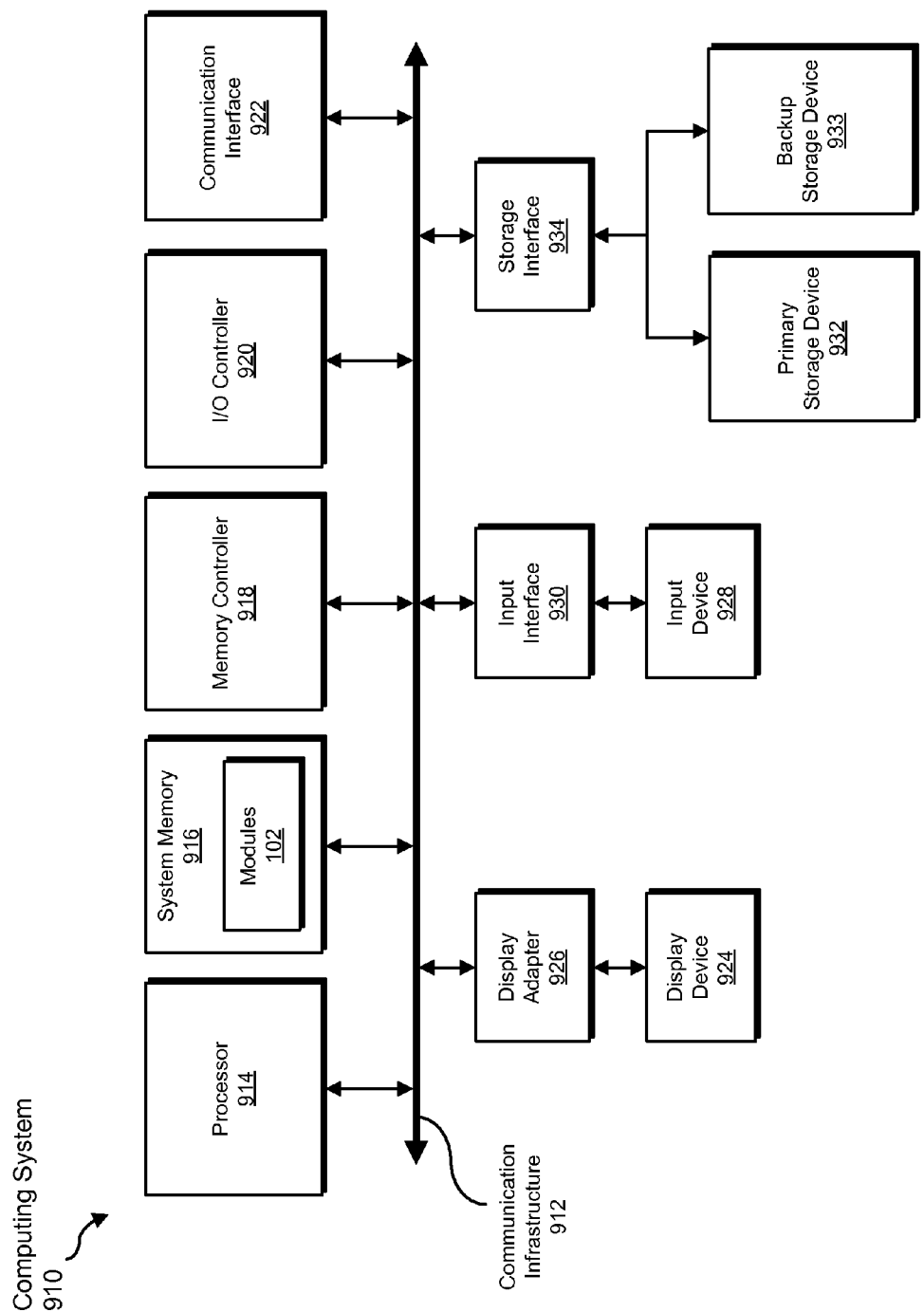
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an Application Specific Integrated Circuit (ASIC) adapted to implement one or more of the exemplary embodiments disclosed herein.

Figure 10:
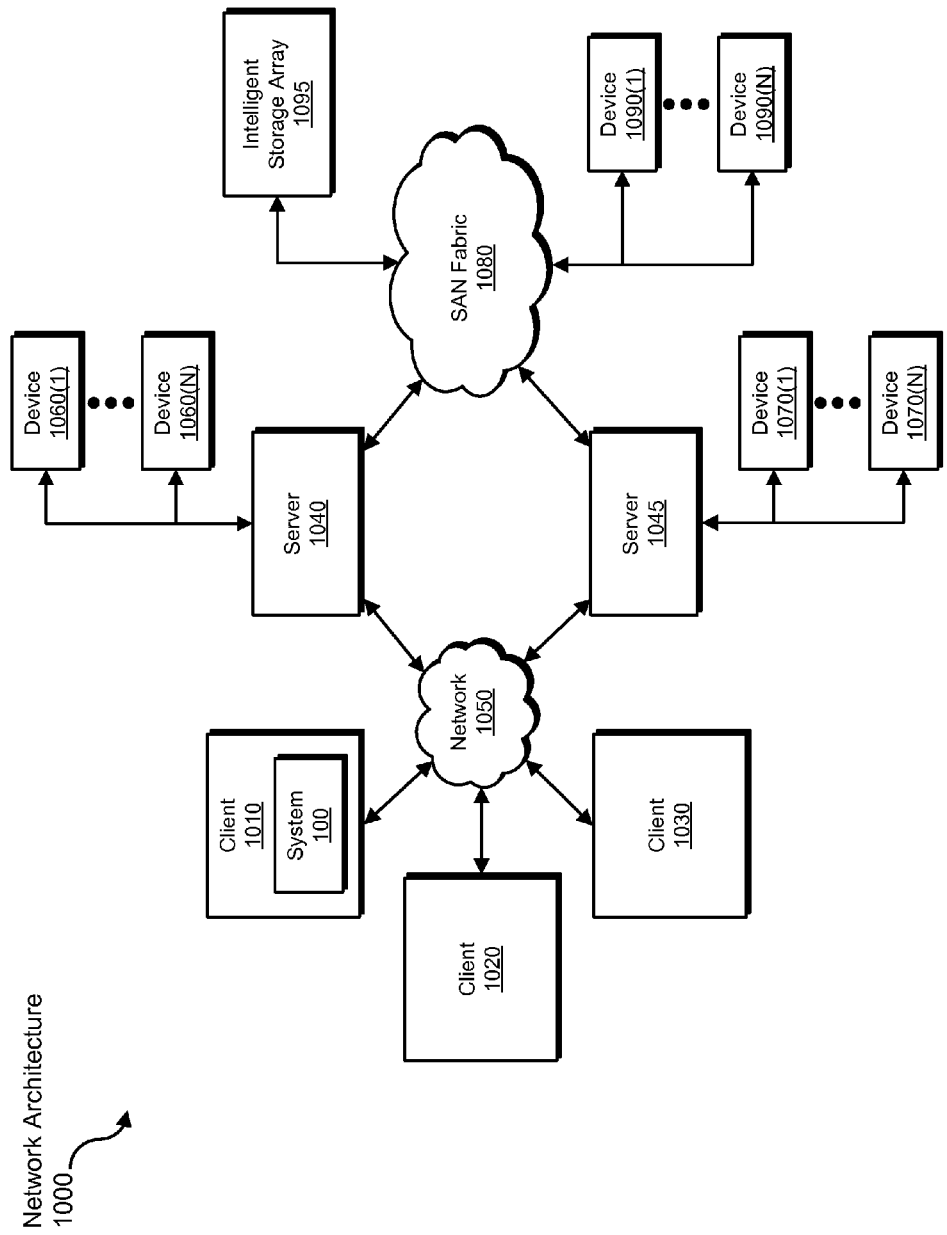
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050.

Additionally or alternatively, all or a portion of one or more of the exemplary embodiments disclosed herein may be encoded as a computer program and loaded into a network device and/or server (not illustrated in FIG. 10) within network 1050. Accordingly, such exemplary embodiments may include and/or represent a service that is essentially transparent to one or more of client systems 1010, 1020, and 1030 that are communicating with one or more third-party servers (not illustrated in FIG. 10). In one example, these third-party servers may include and/or represent servers that host Internet services and/or web resources.

As detailed above, computing system 910 and/or one or more components of network architecture 1000 may perform and/or be a means for performing, either alone or in combination with other elements, one or more steps of an exemplary method for performing security analyses on network traffic in cloud-based environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an HTTP request to be transformed, transform at least a portion of the HTTP request, output a result of the transformation to a destination device, use the result of the transformation embedded in an HTTP response, and store the result of the transformation to facilitate accessing the portion of the HTTP request and/or identify the entire request/response pair. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing security analyses on network traffic in cloud-based environments, at least a portion of the method being performed by a computing device comprising at least one processor, the method comprising:
   collecting network traffic exchanged between a source device and a destination device for a security analysis by:
      receiving, at a server that handles at least a portion of the network traffic, a request sent by the source device;
      determining that a size of at least a portion of the request is below a certain threshold;
      in response to determining that the size of the portion of the request is below the certain threshold, creating a custom header in the request that includes information that facilitates access to the portion of the request by inserting the portion of the request into the custom header in the request;
      forwarding the request with the custom header to the destination device;
      receiving, from the destination device, a response to the request sent by the source device;
      identifying, in a header of the response, the information that facilitates access to the portion of the request sent by the source device;
      obtaining, based at least in part on the information identified in the header of the response, the portion of the request sent by the source device;
   performing the security analysis on the network traffic by analyzing the portion of the request sent by the source device and at least a portion of the response received from the destination device.

2. The method of claim 1, wherein creating the custom header in the request comprises:
   creating a file that includes the portion of the request;
   inserting a link to the file into the custom header in the request.

3. The method of claim 2, wherein creating the file that includes the portion of the request comprises at least one of:
   storing the file at the server that received the request sent by the source device;
   storing the file at a storage device accessible to the server that received the request sent by the source device.

4. The method of claim 3, wherein:
   receiving the response from the destination device comprises receiving the response at another server that did not receive the request sent by the source device;
   identifying the information that facilitates access to the portion of the request comprises identifying, in the header of the response received at the other server, the link to the file that includes the portion of the request;
   obtaining the portion of the request comprises retrieving, based at least in part on the link identified in the header of the response, the portion of the request included in the file stored at the server.

5. The method of claim 3, wherein:
   receiving the response from the destination device comprises receiving the response at the same server that received the request sent by the source device;
   identifying the information that facilitates access to the portion of the request comprises identifying, in the header of the response received at the server, the link to the file that includes the portion of the request;
   obtaining the portion of the request comprises retrieving, based at least in part on the link identified in the header of the response, the portion of the request included in the file stored at the server.

6. The method of claim 5, wherein the server that receives the request and the response multiplexes, over a single network connection, network traffic exchanged between a plurality of source devices and a plurality of destination devices.

7. The method of claim 1, wherein:
   the portion of the request comprises at least one of:
   a body of the request;
   a header of the request;
   a command line of the request;
   the portion of the response comprises at least one of:
   a body of the response;
   a header of the response;
   a status line of the response.

8. The method of claim 1, wherein the information that facilitates access to the portion of the request comprises at least one of:
   the portion of the request;
   a Uniform Resource Locator (URL) that references a file that includes the portion of the request.

9. The method of claim 1, wherein performing the security analysis on the network traffic comprises:
   providing the portion of the request and the portion of the response to a security scanner;
   directing the security scanner to perform the security analysis on the network traffic by analyzing the portion of the request and the portion of the response.

10. The method of claim 1, wherein:
   the network traffic comprises HyperText Transfer Protocol (HTTP) traffic;
   the request comprises an HTTP request;
   the response comprises an HTTP response.

11. The method of claim 1, wherein the security analysis comprises an Intrusion Prevention System (IPS) analysis.

12. A system for performing security analyses on network traffic in cloud-based environments, the system comprising:
   a collection module, stored in memory, that collects network traffic exchanged between a source device and a destination device for a security analysis by receiving, at a server that handles at least a portion of the network traffic, a request sent by the source device;
   a customization module, stored in memory, that:
      determines that a size of at least a portion of the request is below a certain threshold;
      creates, in response to determining that the size of the portion of the request is below the certain threshold, a custom header in the request that includes information that facilitates access to the portion of the request by inserting the portion of the request into the custom header in the request;

forwards the request with the custom header to the destination device;
wherein the collection module further collects the network traffic by:
receiving, from the destination device, a response to the request sent by the source device;
identifying, in a header of the response, the information that facilitates access to the portion of the request sent by the source device;
obtaining, based at least in part on the information identified in the header of the response, the portion of the request sent by the source device;
a security module, stored in memory, that performs the security analysis on the network traffic by analyzing the portion of the request sent by the source device and at least a portion of the response received from the destination device;
at least one physical processor that executes the collection module, the customization module, and the security module.

13. The system of claim 12, wherein the customization module creates the custom header in the request by:
creating a file that includes the portion of the request;
inserting a link to the file into the custom header in the request.

14. The system of claim 13, wherein the customization module at least one of:
stores the file at the server that received the request sent by the source device;
stores the file at a storage device accessible to the server that received the request sent by the source device.

15. The system of claim 14, wherein the collection module:
receives the response at another server that did not receive the request sent by the source device;
identifies, in the header of the response received at the other server, the link to the file that includes the portion of the request;
retrieves, based at least in part on the link identified in the header of the response, the portion of the request included in the file stored at the server.

16. The system of claim 14, wherein the collection module:
receives the response at the same server that received the request sent by the source device;
identifies, in the header of the response received at the server, the link to the file that includes the portion of the request;
retrieves, based at least in part on the link identified in the header of the response, the portion of the request included in the file stored at the server.

17. A non-transitory computer-readable medium comprising one or more computer-executable instructions that, when executed by at least one processor of a computing device, cause the computing device to:
collect network traffic exchanged between a source device and a destination device for a security analysis by:
receiving, at a server that handles at least a portion of the network traffic, a request sent by the source device;
determining that a size of at least a portion of the request is below a certain threshold;
in response to determining that the size of the portion of the request is below the certain threshold, creating a custom header in the request that includes information that facilitates access to the portion of the request by inserting the portion of the request into the custom header in the request;
forwarding the request with the custom header to the destination device;
receiving, from the destination device, a response to the request sent by the source device;
identifying, in a header of the response, the information that facilitates access to the portion of the request sent by the source device;
obtaining, based at least in part on the information identified in the header of the response, the portion of the request sent by the source device;
perform the security analysis on the network traffic by analyzing the portion of the request sent by the source device and at least a portion of the response received from the destination device.

* * * * *